United States Patent
Spicer (10) Patent No.: US 7,310,102 B2
(45) Date of Patent: Dec. 18, 2007

(54) SYSTEM AND METHOD FOR APPLYING ACCURATE THREE-DIMENSIONAL VOLUME TEXTURES TO ARBITRARY TRIANGULATED SURFACES

(75) Inventor: Sean Spicer, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 11/464,136

(22) Filed: Aug. 11, 2006

(65) Prior Publication Data

US 2007/0076011 A1    Apr. 5, 2007

Related U.S. Application Data

(62) Division of application No. 10/636,441, filed on Aug. 6, 2003, now Pat. No. 7,151,545.

(51) Int. Cl.
  G06T 17/00 (2006.01)
  G06T 11/40 (2006.01)
  G06F 12/02 (2006.01)
  G09G 5/00 (2006.01)
  G06F 12/14 (2006.01)
  G09G 5/02 (2006.01)

(52) U.S. Cl. ............... 345/582; 345/420; 345/424; 345/543; 345/552

(58) Field of Classification Search ........ 345/418–424, 345/581–588, 428, 530, 552, 543–545, 574; 711/147, 153, 155, 173
See application file for complete search history.

(56) References Cited

U.S. PATENT DOCUMENTS 4,467,461 A    8/1984  Rice
6,064,771 A    5/2000  Migdal et al.
6,373,486 B1   4/2002  Simpson
6,438,493 B1   8/2002  West et al.
6,483,520 B1   11/2002 Uchi et al.
6,765,570 B1   7/2004  Cheung et al.
6,850,233 B2 * 2/2005  Hoppe et al. ............... 345/420
6,914,610 B2   7/2005  Lavelle et al.
7,259,766 B1   8/2007  Livesey
2002/0060684 A1  5/2002  Alcorn et al.
2002/0162081 A1  10/2002 Solomon
2003/0152288 A1  8/2003  Balmelli et al.
2005/0030317 A1  2/2005  Spicer
2005/0093863 A1* 5/2005  Hoppe et al. ............... 345/420

OTHER PUBLICATIONS

Henrik Battke, Detlev Stalling, and Hans-Christian Hege, "Fast Line Integral Convolution for Arbitrary Surfaces in 3D," 1997, pp. 181-195, Visualization and Mathematics.

(Continued)

*Primary Examiner*—Wesner Sajous
(74) *Attorney, Agent, or Firm*—Crain, Caton & James (57) ABSTRACT

Systems and methods for displaying volume data on an arbitrary three-dimensional polygonal surface are disclosed. For each polygon in the polygonal surface, a two-dimensional texture tile is created and these texture tiles are combined to form texture atlases. Each texture atlas is allocated a specific amount of memory in a texture cache. Each polygon in the polygonal surface may be scan-converted and the resulting texels may be placed in the texture cache. Voxels that do not intersect any polygon in the polygonal surface may not be scan-converted. This method may result in reduced use of texture cache.

6 Claims, 9 Drawing Sheets

OTHER PUBLICATIONS

Ricardo Avila, Taosong He, Lichan Hong, Arie Kaufman, Hanspeter Pfister, Claudio Silva, Lisa Sobierajski, Sidney Wang, "VolVis: A Diversified Volume Visualization System," paper given at the IEEE Conference on Visualization (5th; 1994; Washington, D.C.), pp. 31-38, printed in the Visualization '94 Proceedings, Oct. 17-21, 1994, Washington, D.C.

Kurt Akeley, "RealityEngine Graphics," Aug. 1993, pp. 109-116, In Computer Graphics, Proceedings of SIGGRAPH 93.

Robert A. Drebin, Loren Carpenter, Pat Hanrahan, "Volume Rendering," Aug. 1988, pp. 65-74, Computer Graphics, vol. 22, No. 4.

Timothy J. Cullip and Ulrich Neuman, "Accelerating Volume Reconstruction with 3D Texture Hardware," 1993, pp. 1-6, Technical Report TR93-027, Department of Computer Science at the University of North Carolina, Chapel Hill.

Brian Cabral, Nancy Cam, and Jim Foran, "Accelerated Volume Rendering and Tomographic Reconstruction Using Texture Mapping Hardware," 1994, pp. 91-98, 1994 Workshop on Volume Visualization, Washington, D.C.

Pederson, Hans Kohling, "Displacement Mapping Using Flow Fields,"1994, 279-284, Computer Graphics Proceedings, Annual Conference Series, 1994.

Lees, Jack A.; Constructing Faults From Seed Picks by Voxel Tracking; The Leading Edge; Mar. 1999, pp. 338-340; Houston, Texas, U.S.

* cited by examiner

SYSTEM AND METHOD FOR APPLYING ACCURATE THREE-DIMENSIONAL VOLUME TEXTURES TO ARBITRARY TRIANGULATED SURFACES

CROSS REFERENCE TO RELATED APPLICATIONS

This application is a divisional of U.S. application Ser. No. 10/636,441 filed Aug. 6, 2003, now U.S. Pat. No. 7,151,545 which is incorporated herein by reference and claims the benefit thereof.

STATEMENT REGARDING FEDERALLY SPONSORED RESEARCH OR DEVELOPMENT

Not applicable.

FIELD OF THE INVENTION

The invention relates to systems and methods for displaying graphical data, and more particularly to techniques for applying accurate three-dimensional volume textures to arbitrary triangulated surfaces.

BACKGROUND OF THE INVENTION

In some fields, it is useful to model real or computer-generated objects in three dimensions. Modeling such objects proves useful in a variety of applications. For example, modeling the subsurface structure of a portion of the earth's crust is useful for finding oil deposits, locating fault lines, and in other geological applications. Similarly, modeling human body parts is useful for medical training exercises, diagnoses, performing remote surgery, or for other medical applications. Modeling computer-generated objects is useful in creating computer games, designing flight simulations, and other applications. Other applications for three-dimensional modeling of real and computer-generated objects exist.

Some three-dimensional models represent an object as a three-dimensional matrix of volume data points. Such a matrix, known as a data volume, includes a plurality of data points, known as volume data points. Each volume data point may be referred to as a volume pixel, also known as a voxel. A voxel is the smallest distinguishable box-shaped part of a three-dimensional image. A voxel is similar to a pixel, but represents a three-dimensional volume rather than a two-dimensional area. Each voxel represents a discrete sampling of a three-dimensional portion of the object being modeled.

Each voxel in the data volume contains a unique set of coordinates (x,y,z) and one or more data values that represent a specific property being examined. These data values may be illustrated on a scale (0-256) which corresponds to a specific Red. Green, Blue color value (RGB) and opacity variable (A) that are derived from a measurement or value of the property being examined. The measurement or value of the property corresponds to the portion of the object that the voxel represents. This allows for a graphical representation of the property being examined.

For example, in seismic or geological applications, seismic data is obtained by artificially creating sound waves and recording the arrival of these sound waves after they are reflected from interfaces of subsurface rock formations with different physical properties. A data volume representing the subsurface structure is then created from the reflected sound waves, or seismic data. In such an example, each voxel contains a data value representing a transmission wave (i.e., amplitude) from the reflected sound wave. Geological structure may be inferred from the displayed image of this data value. For example, the highest seismic amplitude data values may be represented by the color red, slightly lower amplitude data values may be represented by the color orange, and other amplitude data values may be represented by other colors. Other color schemes are possible. This allows for a graphical representation of the seismic data.

Once a data volume has been created, its contents can be displayed to users. A user may specify a three-dimensional surface contained within the volume, and a display system displays the voxels on this surface on a screen or other display medium. This enables a user to view voxels that are contained in the interior of the data volume.

One system for displaying the voxels on an arbitrary three-dimensional surface is known as three-dimensional texture mapping. This technique is implemented in the raster processing unit of a computer graphics hardware accelerator. This technique uses a specific specialized memory, known as texture cache or texture memory, that is set aside on the integrated circuit.

In this technique, the texture cache is used as a buffer for the information contained in the data volume. A block or portion of the data volume is read into the texture cache, and information in this block is used by the raster processing unit. Subsequently, a second block of the data volume is read into the texture cache, and information in the second block is used by the raster-processing unit. This process continues until the entire data volume has been made available to the raster processing unit, one block at a time, through the texture cache. In this way, the texture cache is used as a buffer for the data volume.

Such a technique has certain inherent properties that render it inefficient for particular situations. For example, for data volumes that are large compared to the size of the available texture cache, the data volume must be broken up into blocks and each block must be swapped into the texture cache. This is inefficient because of the relatively large overhead required in determining the size of each block and reading it into the texture cache.

Furthermore, even though only the voxels that lie on the three-dimensional surface may be needed by the raster processing unit in such a technique, every voxel in the data volume is read into and stored in the texture cache. Thus, memory in the texture cache is not used efficiently because a relatively large amount of unneeded data may be stored in the texture cache. This problem is exacerbated when the three-dimensional surface is small compared to the data volume.

In addition, because a relatively large amount of texture cache is used in this operation, the amount of texture cache available to other graphics operations is limited. This limits the performance of the rendering of the object and limits the performance of other graphics operations.

There is a need among other things for a technique for displaying the contents of a data volume on an arbitrary three-dimensional surface contained within the volume, that uses a reduced amount of texture cache.

SUMMARY OF THE INVENTION

In one aspect, an embodiment of the invention overcoming these and other problems in the art relates to a method for applying a three-dimensional volume texture to a polygon. The method includes the steps of providing a data volume comprising a plurality of volume data points, providing a polygonal surface partially or wholly contained within the data volume, the polygonal surface comprising at least one polygon, creating a set of texture atlases, each texture atlas comprising a two-dimensional layout of at least one polygon in the polygonal surface, and allocating a segment of memory for each texture atlas. The method also includes the steps of scan-converting each polygon based on the volume data points in the data volume and writing the results of the scan conversion of each polygon into the segment of memory allocated to the texture atlas containing a layout including the polygon.

In a further aspect, the invention includes a texture tile having tile dimensions describing a tile size and a representation of a polygon, the polygon being wholly or partially contained in a three-dimensional data volume.

In yet a further aspect, a texture atlas includes atlas dimensions describing an atlas size and a representation of a polygon, the polygon being wholly or partially contained in a three-dimensional data volume.

In yet an additional aspect, a segment of memory includes a plurality of texels (base units of textured graphics), the plurality of texels including one or more predetermined polygon texels and one or more predetermined non-polygon texels, wherein each polygon texel in the plurality of texels contains a value computed based on a volume data point in a data volume, and each other texel is invalid.

In a still further aspect, the invention includes a system for applying a three-dimensional volume texture to a polygonal surface. The system includes a texture cache configured to contain a plurality of texels, and a memory configured to contain a polygonal surface and a data volume, the polygon surface comprising one or more polygons and the data volume comprising one or more volume data points. The system also includes a control module configured to create a set of texture atlases, each texture atlas comprising a two-dimensional layout of at least one polygon in the polygonal surface, to allocate a segment of the texture cache for each texture atlas, to scan-convert the at least one polygon, thereby creating one or more texels, and to write the one or more texels resulting from the scan conversion of each polygon into the segment of the texture cache allocated to the texture atlas containing a layout including the polygon.

BRIEF DESCRIPTION OF THE DRAWINGS

The invention will be described with reference to the accompanying drawings, in which like elements are referenced with like reference numerals, and in which.

DETAILED DESCRIPTION OF EMBODIMENTS

Figure 1:
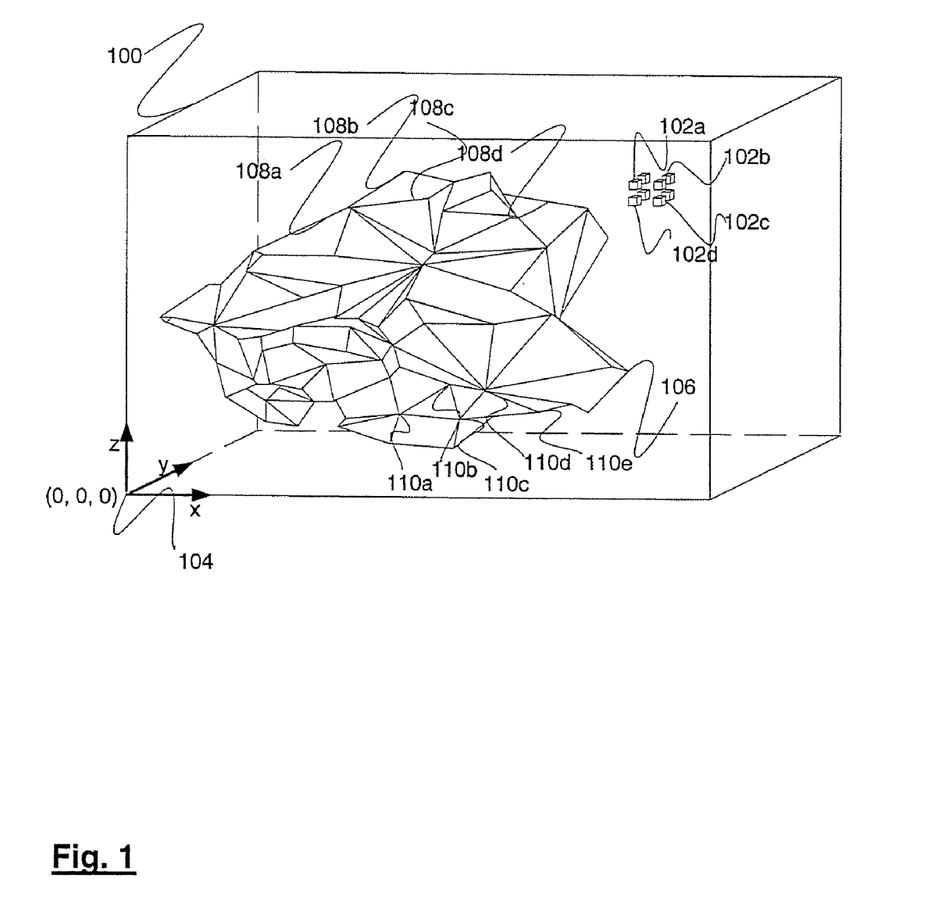
FIG. 1 illustrates a data volume and a three-dimensional surface in accordance with an embodiment of the invention.

FIG. 1 illustrates a data volume and a three-dimensional surface in accordance with an embodiment of the invention. A data volume 100 may be or include a three-dimensional model of a real or computer-generated object. The data volume 100 may be or include a three-dimensional matrix of volume data points 102$a$-$d$.

Each of the volume data points 102$a$-$d$ may contain one or more values that describe a particular portion of the data volume 100. For example, each of the volume data points 102$a$-$d$ may contain x,y,z coordinates that specify the location of a portion of the data volume 100. Each of the volume data points 102$a$-$d$ may further contain one or more data values corresponding to one or more specific properties. For example, each of the volume data points 102$a$-$d$ may contain a data value corresponding to a seismic property, a density, or some other property.

In one implementation, each of the volume data points 102$a$-$d$ may be or include a voxel. Each voxel may be displayed as a combined color value and opacity variable (RGBA) that are derived from a measurement or value of a specific property.

The data volume 100 may be defined in any coordinate system, for example, in a Cartesian coordinate system with an origin 104.

A polygonal surface 106 may be wholly or partially contained in the data volume 100. The polygonal surface 106 may be a two- or three-dimensional surface that is chosen or specified by a user or by a computer. The polygonal surface 106 may be chosen to enable a user to examine the volume data points 102$a$-$d$ that intersect the polygonal surface 106. The polygonal surface 106 may, in some applications, be chosen in order to exactly or approximately model a naturally occurring surface. For example, the polygonal surface 106 may be chosen in order to model an interface between layers of the earth's crust.

The polygonal surface 106 may be defined by one or more polygons 108$a$-$d$. Various methods for describing each polygon are possible. For example, each polygon may be defined by a set of vertices and edges. In one implementation, the polygons 108$a$-$d$ are triangles, and each of the polygons 108$a$-$d$ is defined by the Cartesian coordinates of its vertices.

Figure 2:
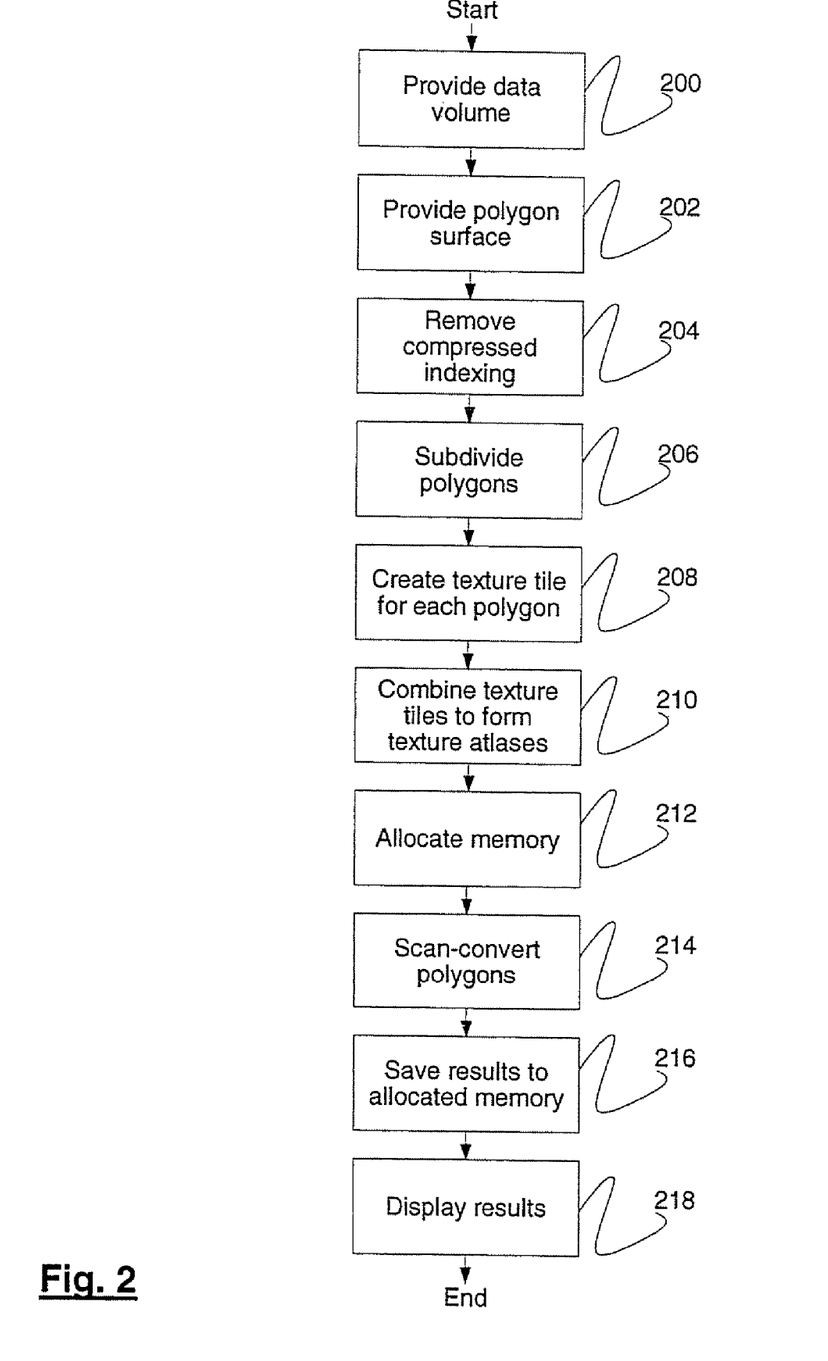
FIG. 2 is a flow chart depicting a method for applying volume data to a surface in accordance with an embodiment of the invention.

FIG. 2 is a flow chart depicting a method for applying volume data to a surface in accordance with an embodiment of the invention. The method begins in step 200, wherein a data volume 100 may be provided. The data volume 100 may be generated from measured data such as seismic data, or may be otherwise generated.

In step 202, a polygonal surface 106 may be provided. The polygonal surface 106 may be user- or computer-specified. The polygonal surface 106 may be chosen in order to examine the volume data points 102$a$-$d$ that intersect the polygonal surface 106. The polygonal surface 106 may be chosen to exactly or approximately model a naturally occurring surface or may be otherwise chosen.

In step 204, compressed indexing of the polygons 108$a$-$d$ may be removed. In some implementations, the polygons 108$a$-$d$ may be represented using a form of compressed indexing also referred to as vertex indexing or triangle stripping. For example, 110a-d each represent a vertex shared by two or more polygons. In order to remove this form of compressed indexing and assign a set of vertices unique to each polygon for separate identification, each vertex 110a-d is assigned a vertex number Vn and a polygon number Pn. In this manner, each polygon can be separately indexed according to its own set of vertices. For example, the polygon bound by 110a-c would be represented by Vn=0,1,2 and Pn=0; the polygon bound by 110b-d would be represented by Vn=0,1,2 and Pn=1; and the polygon bound by 110c-e would be represented by Vn=0,1,2 and Pn=2. Other methods of removing this and other forms of compressed indexing may be well known in the art and therefore, are not repeated here.

In step 206, polygons 108a-d may be subdivided. This step may ensure that each polygon 108a-d may fit onto a texture tile in step 208. In one implementation, a maximum texture tile size is specified. In this implementation, some polygons may not fit onto the largest permissible texture tile. In this case, these polygons may be subdivided into smaller polygons that fit onto texture tiles of permissible size.

In step 208, a texture tile may be created for each polygon 108a-d. The texture tiles created in this step are described with reference to FIG. 3 Each texture tile 300a-d may include or represent a two-dimensional array or other portion of electronic memory that is sized to fit a particular polygon 108a-d. If a particular polygon 108a-d is smaller than the predetermined size of the tile, then, in one implementation, each texture tile 300a-d includes the smallest two-dimensional array that contains a particular polygon 108a-d. In another implementation where a particular polygon 108a-d is smaller than the predetermined size of the tile, each texture tile 300a-d includes the dimensions of an array that is large enough to contain a particular polygon 108a-d, but does not contain the physical array itself. Each texture tile 300a-d may contain information describing the particular corresponding polygon 108a-d. For example, each texture tile may comprise coordinates (x,y,z) of the vertices for each corresponding polygon 108a-d, and a number (Pn) which identifies the polygon.

Figure 3:
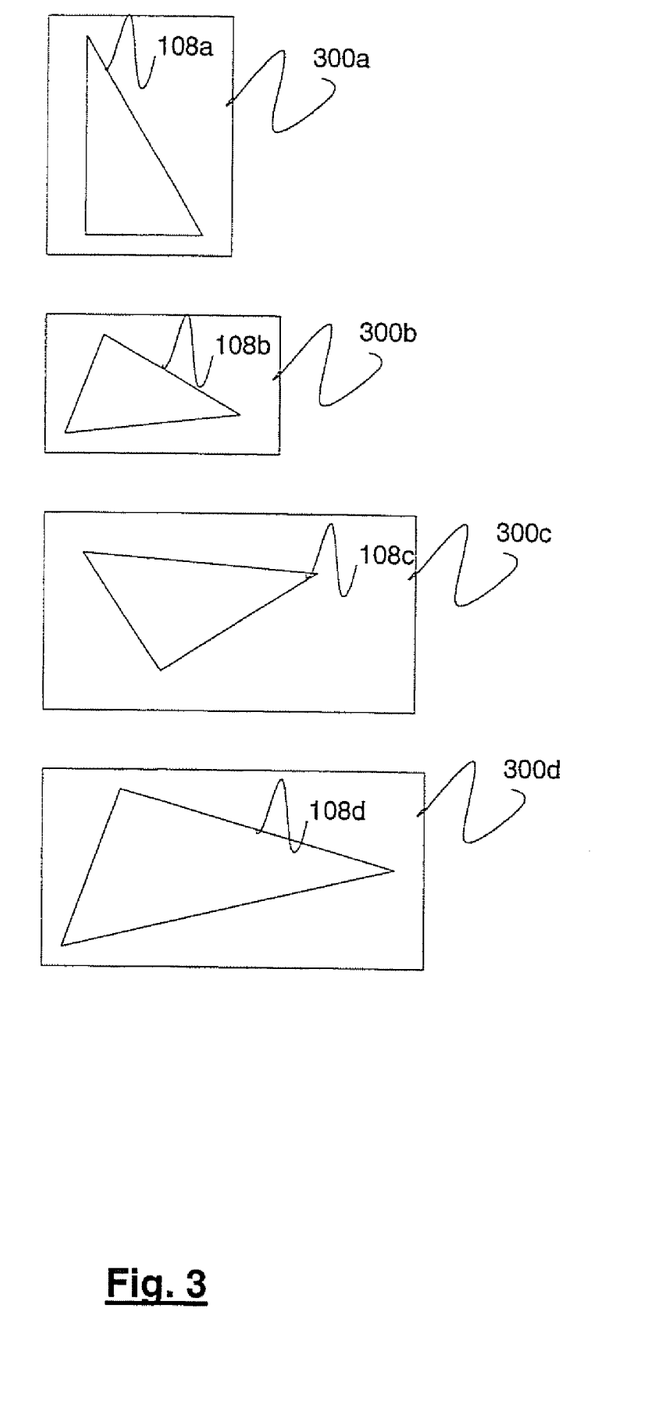
FIG. 3 illustrates a set of texture tiles in accordance with an embodiment of the invention.

Each texture tile 300a-d may also contain a number (Tn) that identifies the tile, a number (An) that identifies the texture atlas created in step 210 that is associated with the tile, coordinates (s',t') that identify the location of the tile on the texture atlas, coordinates (s,t) that identify the position of the tile in the displayed image, and coordinates (x',y') that identify an origin for the polygonal surface 106.

In step 210, the texture tiles 300a-d may be combined to form one or more texture atlases. The texture atlases created in this step are described with reference to FIG. 4. Each texture atlas 400a-c may be or include a two-dimensional layout of texture tiles 300a-d. Each texture tile 300a-d may be placed into one texture atlas 400a-c. If there is no space in any existing texture atlas 400a-c, a new texture atlas 400a-c may be created. In some implementations, a user may specify a target or maximum size for each texture atlas 400a-c.

Figure 4:
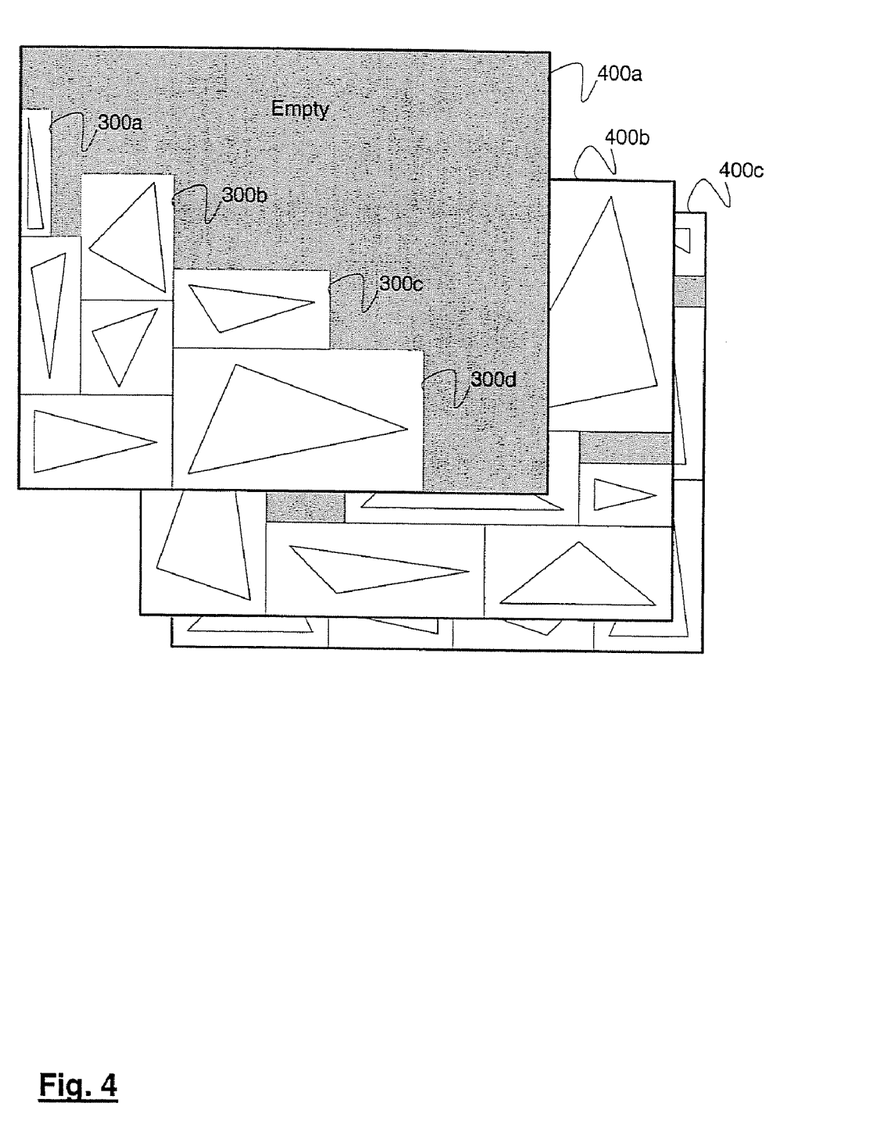
FIG. 4 illustrates a set of texture atlases in accordance with an embodiment of the invention.
Figure 5:
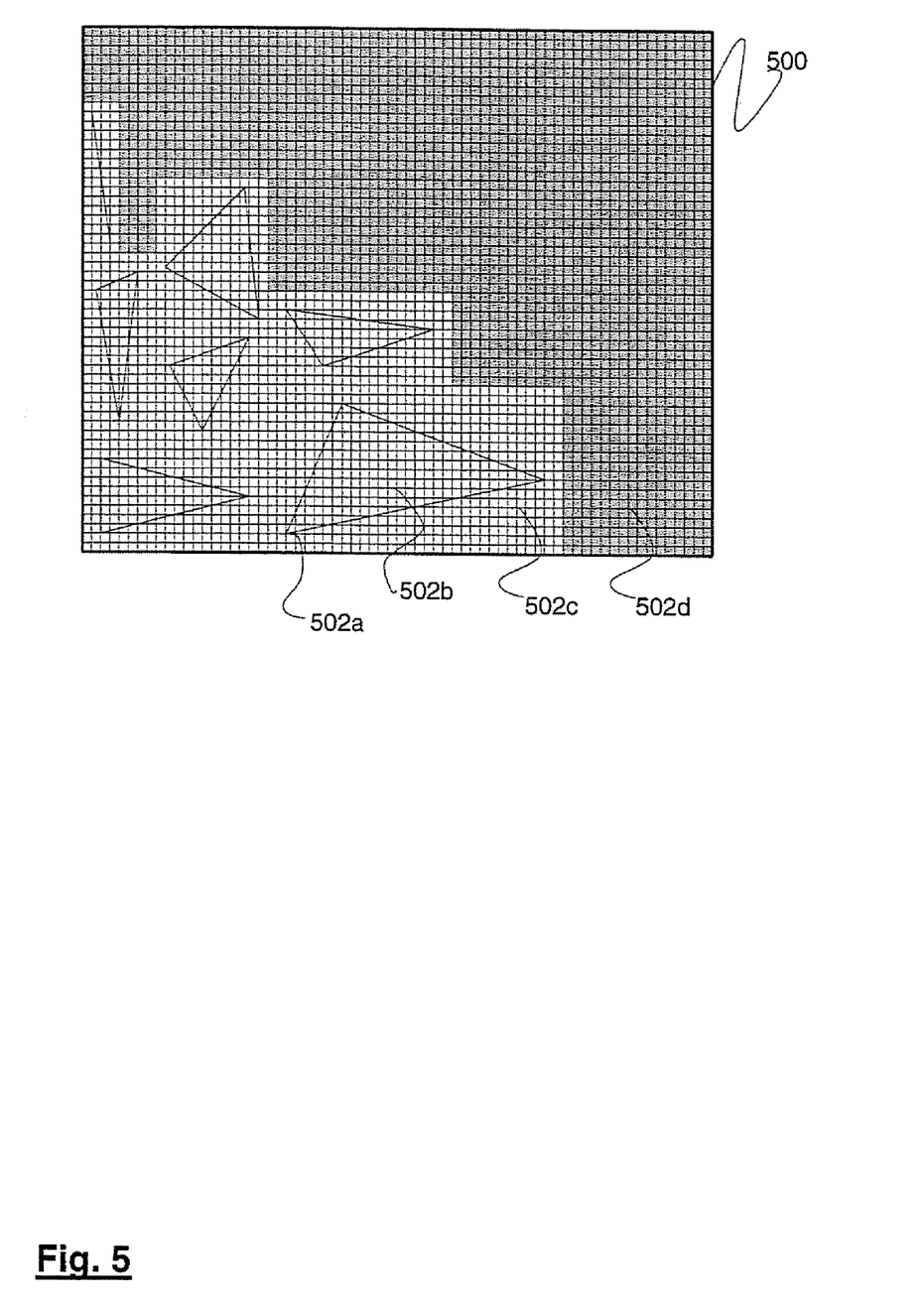
FIG. 5 illustrates a segment of texture memory in accordance with an embodiment of the invention.

In another implementation, each texture atlas 400a-c may be or include a two-dimensional array or other type of electronic memory that is configured to contain one or more texture tiles 300a-d. In yet another implementation, each texture atlas 400a-c may contain information about how the texture tiles 300a-d could be optimally arranged in a two-dimensional layout, including where each texture atlas 400a-c is located in the memory segment 500 discussed in reference to step 212. In this implementation, it may be unnecessary for the texture atlases to contain enough physical memory to contain each texture tile 300a-d.

As thus described, the creation of the texture tiles 300a-d in steps 206 and 208 and the creation of the texture atlases 400a-c in step 210 may be performed in an optimized fashion. This will reduce or minimize empty or unused space in the texture tiles 300a-d, the texture atlases 400a-c, or both. In this manner, the available texture memory space is optimized using the foregoing techniques. Other well-known optimization techniques, such as those described in the paper *Fast Line Integral Convolution for Arbitrary Surfaces in 3D* by Battke, Stalling and Hege published in the 1997 edition of *Visualization and Mathematics*, may also be applied.

In step 212, a memory segment may be allocated for each texture atlas 400a-c. The memory segments allocated in this step are described with reference to FIG. 5. The dimensions of the memory segment 500 allocated for a particular texture atlas 400a may equal to or may be proportional to the dimensions of the texture atlas 400a. The memory segment 500 may be or include one or more segments of texture memory or texture cache. The memory segments 500 may include a plurality of texels 502a-d. A texel is the base unit of a textured graphic, a graphic that defines the surface of a three-dimensional object. The texels 502a-d may be indivisible units of texture present in the memory segment 500. One or more texels 502a and 502b may correspond to a portion of the texture atlas 400a that is wholly or partially contained within a polygon 108d. These texels 502a and 502b may be referred to as polygon texels. One or more texels 502c may correspond to a portion of the texture atlas 400a that is contained within a texture tile 300d, but is not contained within any polygon 108a-d. These texels may be referred to as tile texels. One or more texels 502d that are neither polygon texels nor tile texels may be included in the memory segment 500. Because the information contained in the texture atlas and the texture tiles may be used to determine which of the texels in the memory segment are polygon texels, the polygon texels in the memory segment 500 may be considered to be predetermined.

Figure 6:
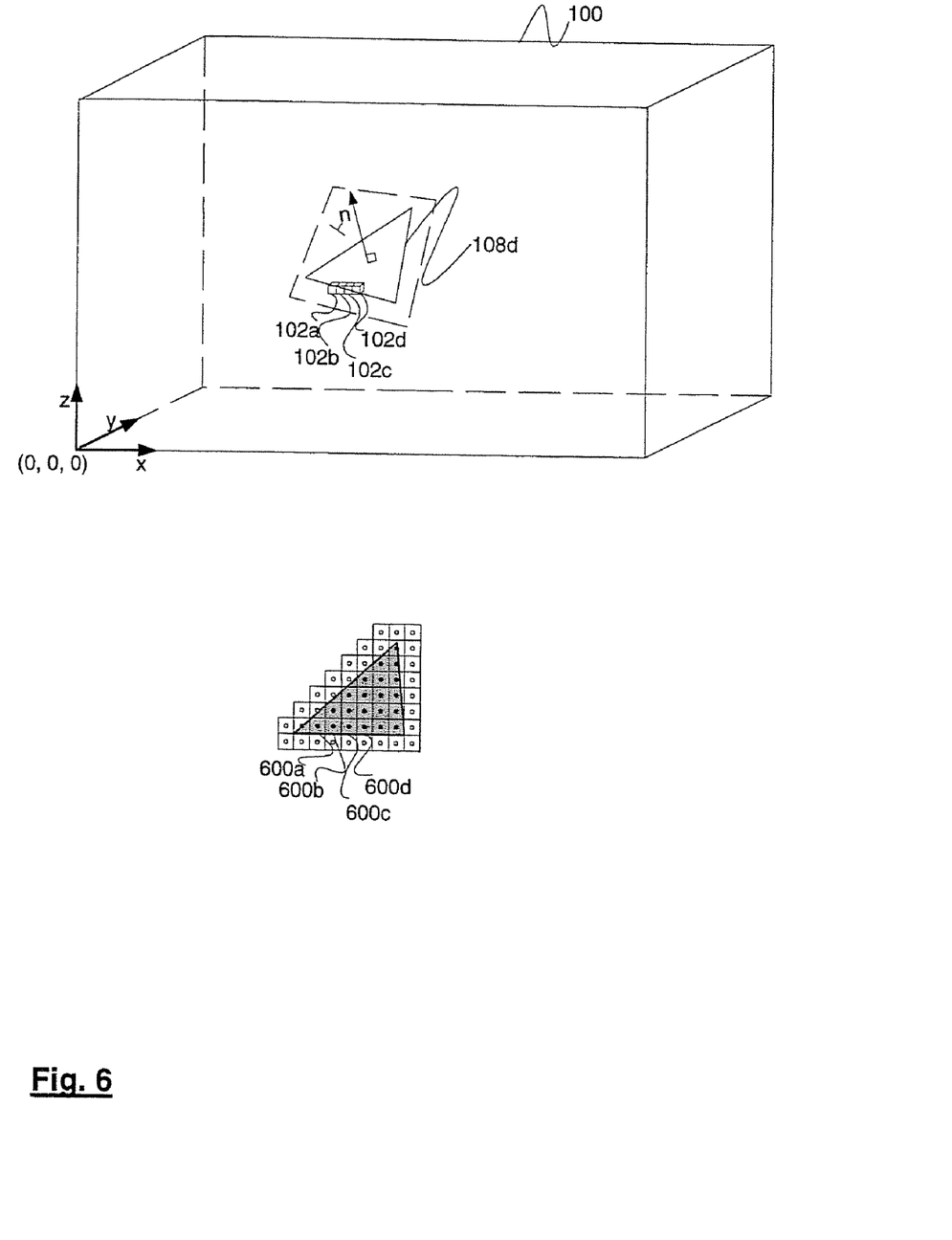
FIG. 6 illustrates a polygon before and after scan-conversion in accordance with an embodiment of the invention.

In step 214, each polygon 108a-d may be scan-converted. The step of scan converting a polygon is described with reference to FIG. 6. Scan conversion is the process by which data values contained in the data volume 100 are mapped into texels. One or more of the volume data points 102a-d in the data-volume 100 may intersect the particular polygon 108d. From the information contained in these intersecting volume data points 102a-d, texels 600a-d are created that correspond to the volume data points 102a-d. If the volume data points 102a-d include voxels, the voxels may be mapped into corresponding texels 600a-d using a well-known mathematical technique referred to as tri-linear interpolation. Using this technique, each texel is determined by a linear weighting of the eight (8) voxels that are nearest the texel in the data-volume 100. The texels 600a-d that are created in the scan-conversion may correspond to the polygon texels 502a-b that are contained in the memory segment 500. The arrangement of the texture tiles within each texture atlas, and the location of each texture atlas within the memory segment, is not set until this step.

In step 216, results of the scan-conversion may be written to the memory segment 500. This may include writing the texels 600a-d into the polygon texels 502a-b in the memory segment 500. In one implementation, each texel 600a-d maybe written to a corresponding polygon texel 502a-b as it is created. In another implementation, texels 600a-d corresponding to a particular polygon 108a-d may be created, and all the texels 600a-d for the polygon 108a-d may be written to the memory segment 500. In other implementations, texels 600a-d corresponding to a particular texture atlas 400a-c may be created and written as a group, or all texels corresponding to all polygons 108a-d may be created and written as a group.

The memory segment 500 may contain one or more texels 502c-d that are not polygon texels. These texels may not contain information that is useful in the rendering of the surface 106. Therefore, these texels may be considered invalid. In one implementation, the invalid texels 502c-d may be blank texels, texels containing only initial values, or texels that are otherwise specifically marked invalid. In another implementation, invalid texels 502c-d may contain texel data, for example texel data from a previous surface rendering or another operation.

After all the polygon texels 502a-b for all polygons in the polygonal surface 106 have been written to the memory segments 500, the memory segments 500 may contain the required information to display the information contained in the data volume 100 on the surface 106.

In step 218, the results may be displayed to a user. The contents of the memory segments 500 may be displayed via a cathode ray tube or other screen, may be printed, or may be otherwise displayed.

The method may be performed in conjunction with other systems and methods for graphically displaying volume data. For example, the method can be used in conjunction with a system for analyzing and imaging three-dimensional volume data sets described in the commonly-owned U.S. patent application "System and Method for Analyzing and Imaging Three-Dimensional Volume Data Sets." Ser. No. 09/119,635, which is incorporated herein by reference. When practicing the present invention in conjunction with such a device, a number of sampling probes, or user-specified surfaces, can be created, shaped, sized, and moved interactively by the user within the whole 3D volume data set. The intersection of the sampling probe with the whole 3D volume data set is texture mapped onto the surfaces of the sampling probe, or volume rendered with varying degrees of transparency within the sampling probe. For example, as the user moves the sampling probe, such as by "clicking and dragging" with a "mouse," the user perceives the texture on the surfaces of the sampling probe changing in "real-time" with movement of the sampling probe. In this manner, the user can interactively move the sampling probes through the whole 3D volume, and more easily and effectively visualize and interpret the features and physical parameters that are present within the geographic space represented by the whole 3D volume data set.

Figure 7:
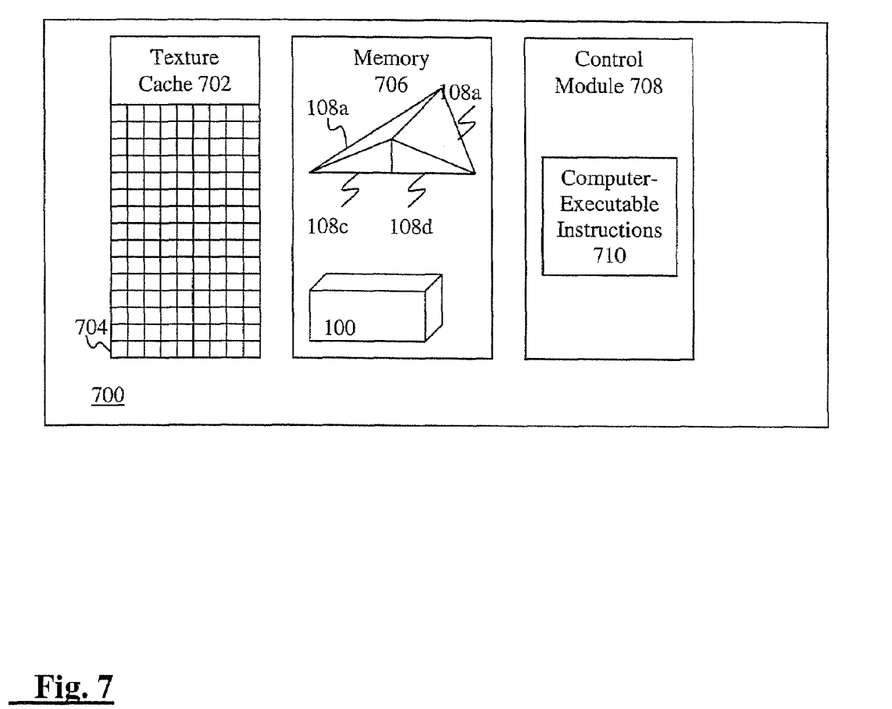
FIG. 7 is a block diagram of a system for applying a three-dimensional volume texture to a polygonal surface in accordance with an embodiment of the invention.

Referring now to FIG. 7, a block diagram of a system for applying a three-dimensional volume texture to a polygonal surface is shown in accordance with an embodiment of the invention. A system 700 may include a texture cache 702 containing a plurality of texels 704. The system 700 also includes a memory 706 which may contain a polygonal surface 106 and a data volume 100. The polygonal surface 106 may be represented in the memory 706 by a plurality of vertex coordinates describing a plurality of polygons 108a-d or by some other method. The data volume 100 may be represented in the memory 706 by a plurality of volume data points 102a-d. Each of the volume data points 102a-d may be or include a voxel.

The system 700 also contains a control module 708. The control module 708 may be capable of executing computer-executable instructions. The control module 708 may include or reference computer-executable instructions 710.

The computer-executable instructions 710 may be stored in the control module 708, in the memory 706, or in another location. The control module 708 may execute the computer-executable instructions 710 in order to perform various functions.

The control module 708 may be configured to perform various functions by executing the computer-executable instructions 710. The control module 710 may be configured to remove compressive indexing from the polygonal surface 106, for example, by distinctly representing each vertex of each polygon 108a-d in the polygonal surface 106. The control module 708 may also be configured to subdivide those polygons 108a-d in the polygonal surface 106 that are larger than a maximum permissible tile size.

The control module 708 may also be configured to create a texture tile 300a-d for each polygon 108a-d contained in the polygonal surface 106. The control module 708 may store the texture tiles 300a-d in the memory 706 or elsewhere. The control module 708 may further be configured to combine the texture tiles 300a-d in one or more texture atlases 400a-c. The control module 708 may store the texture atlases 400a-c in the memory 706 or elsewhere.

The control module 708 may further be configured to allocate a segment 710a-c of the texture cache 702 for each of the texture atlases 400a-c. The control module 708 may also be configured to scan-convert each polygon 108a-d in the polygonal surface 106 based on the volume data points 102a-d contained in the data volume 100. The results of the scan conversion may be one or more texels, which may be written to the texels 704 of the texture cache 702. The texels 704 that are written as the result of a scan-conversion of a particular polygon 108a may be texels 704 that are contained in the segment 710a that is allocated to the texture atlas 400a that contains a layout including the polygon 108a.

The control module 708 may also be configured to display the results of the scan-conversion to a user via a cathode ray tube, other screen, printer, or other display device.

Figure 8:
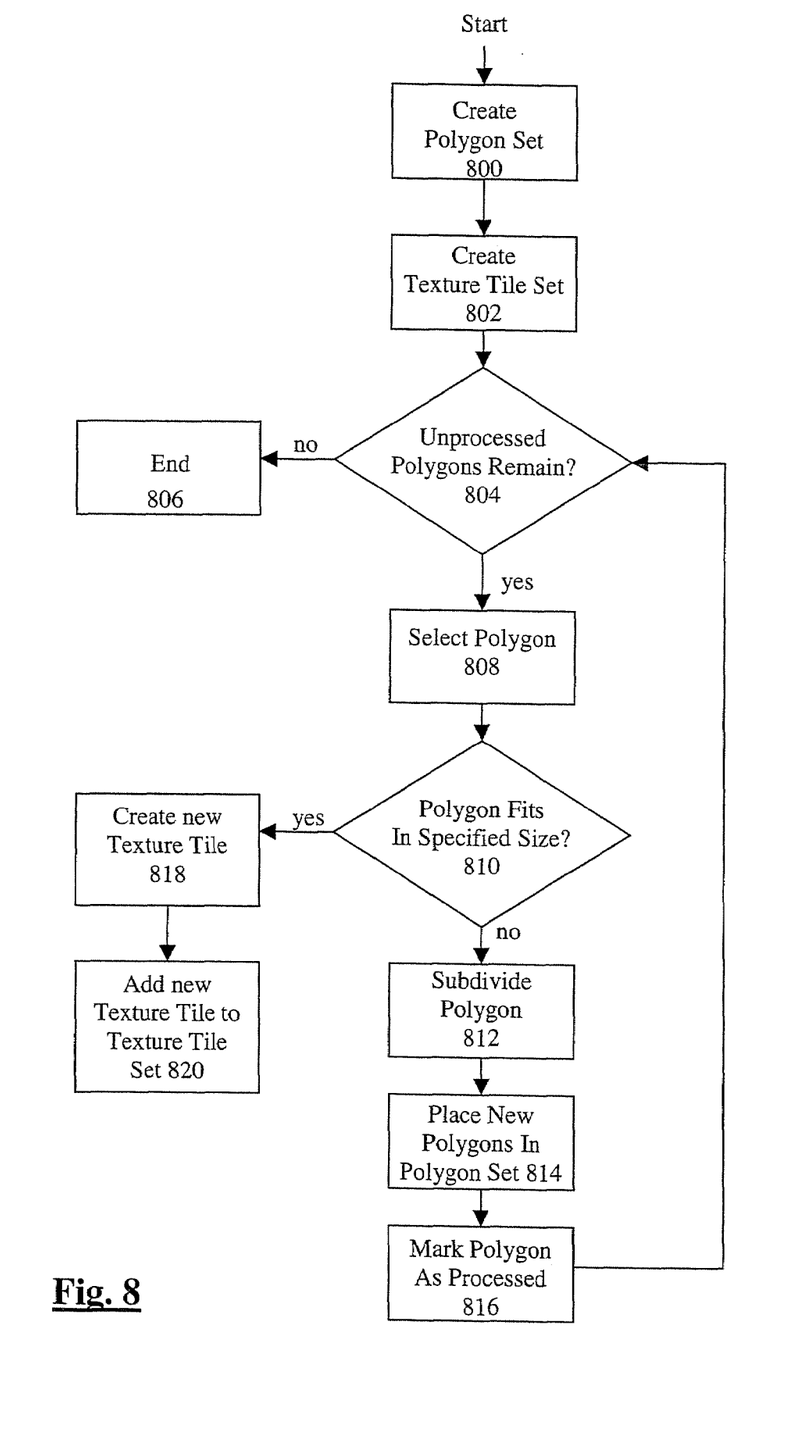
FIG. 8 is a flow chart depicting a method for polygon subdivision and texture tile creation in accordance with an embodiment of the invention.

FIG. 8 is a flow chart depicting one implementation of a method for polygon subdivision and texture tile creation in accordance with an embodiment of the invention. This method may be one implementation of steps 206 and 208 in FIG. 2.

The method begins in step 800, wherein a polygon set may be created. The polygon set may be a representation of the polygons 108a-d that make up a polygonal surface 106. In one implementation, the step 800 of creating a polygon set may include removing compressive indexing in the representation of the polygons 108a-d. In another implementation, the polygons may already be represented without compressive indexing.

In step 802, a texture tile set may be created. The texture tile set may be configured to hold one or more texture tiles 300a-d. The texture tile set may contain a maximum texture tile size, which may be represented by a width and a height. The texture tile set may not contain any texture tiles 300a-d when it is created.

In step 804, the polygon set is examined to determine whether any unprocessed polygons 108a-d remain in the polygon set. If the polygon set does not contain one or more unprocessed polygons, the method is complete, and the method ends in step 806.

If the polygon set contains one or more unprocessed polygons 108a-d, one of the unprocessed polygons 108a-d is selected in step 808. In step 810, the polygon 108a-d is examined in order to determine whether the polygon 108a-d will fit in a texture tile 300a-d of the maximum permissible size. If the polygon 108a-d will not fit in a texture tile 300a-d of the maximum permissible size, the polygon 108a-d may be subdivided in step 812. Subdivision may be any process by which several smaller polygons 108a-d are created, the union of which is the original polygon 108a-d. In one implementation, the polygon 108a-d is subdivided bisecting the longest edge of the polygon 108a-d, and by creating a new edge at the bisection point of a vertex of the polygon 108a-d. In another implementation, the polygon 108a-d may be subdivided by centroid degeneration. This may include finding the centroid of the polygon 108a-d, and creating a new edge from each vertex of the polygon 108a-d to the centroid.

In step 814, the polygons 108a-d resulting from the subdivision may be placed in the polygon set. This may ensure that each of these polygons 108a-d is subdivided if necessary, and that a texture tile 300a-d is created for each.

In step 816, the original polygon 108a-d may be marked as processed. This may include, for example, setting a Boolean variable or otherwise denoting that the polygon 108a-d has been examined. A texture tile 300a-d need not be created for the original polygon 108a-d since texture tiles 300a-d for the polygons 108a-d resulting from the subdivision will be created.

If it is determined in step 810 that the polygon 108a-d being examined will fit into a texture tile 300a-d of maximum permissible size, a new texture tile 300a-d may be created in step 818. The texture tile 300a-d that is created may include the polygon 108a-d or may contain information describing the polygon 108a-d. In one implementation, the dimensions of the texture tile 300a-d may be chosen to reduce the size of the texture tile 300a-d while ensuring that the texture tile 300a-d contains the polygon 108a-d. For example, in one implementation, the texture tile 300a-d may be the smallest rectangular texture tile 300a-d that contains the polygon 108a-d.

In step 820, the texture tile 300a-d may be added to the texture tile set. The method then continues in step 816, wherein the polygon 108a-d is marked as processed. The method returns to step 804, wherein it is determined if there are any unprocessed polygons 108a-d remaining in the polygon set.

Figure 9:
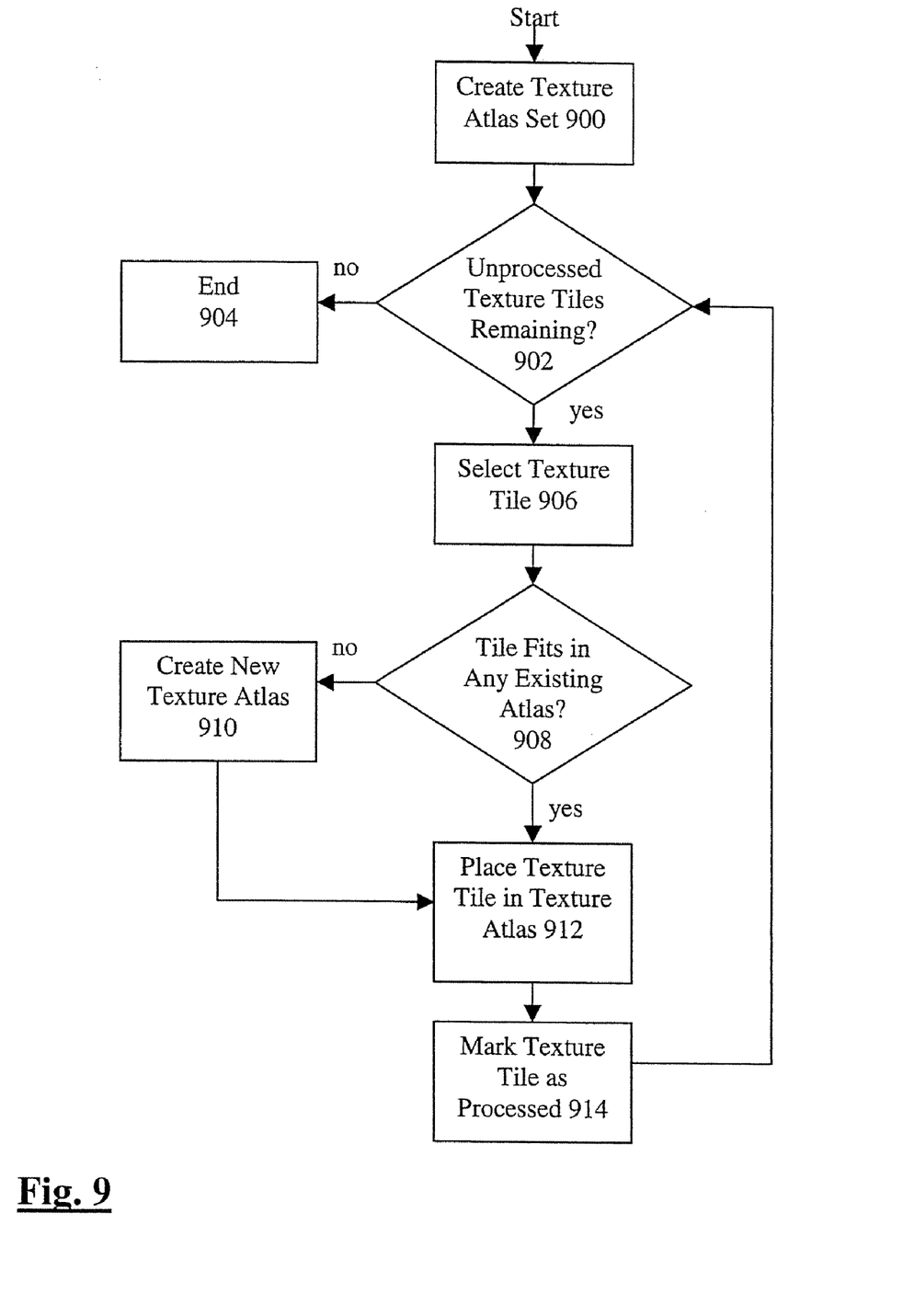
FIG. 9 is a flow chart depicting a method for texture atlas generation in accordance with an embodiment of the invention.

FIG. 9 is a flow chart depicting one implementation of a method for texture atlas generation in accordance with step 210 in FIG. 2. The method begins in step 900, wherein a texture atlas set may be created. The texture atlas set may be configured to hold one or more texture atlases 400a-c. The texture atlas set may contain a maximum texture atlas size, which may be represented by a width and a height. The texture atlas set may not contain any texture atlases 400a-c when it is created.

In step 902, a texture tile set may be examined to determine whether any unprocessed texture tiles 300a-d remain in the texture tile set. The texture tile set examined may be the texture tile set created in the method of FIG. 8. If the texture tile set does not contain one or more unprocessed texture tiles 300a-d, the method is complete, and the method ends in step 904.

If the polygon set contains one or more unprocessed texture tiles 300a-d, one of the unprocessed texture tiles 300a-d is selected in step 906. In step 908, the texture tile 300a-d and the atlas set are examined in order to determine whether the texture tile 300a-d will fit into any texture atlas 400a-c contained in the texture atlas set. If the texture tile 300a-d will not fit into any texture atlas 400a-c, a new texture atlas 400a-c may be created in step 910. The new texture alas 400a-c may be placed in the texture atlas set. In one implementation, empty space in the texture atlas 400a-c is represented by empty texture tiles 300a-d in the texture atlas 300a-c. These may be texture tiles 300a-d that are specifically marked as empty. In this implementation, a single empty texture tile 300a-d, of the dimensions of the texture atlas 400a-c, may be added to the texture atlas 400a-c.

In step 912, the texture tile 300a-d selected in step 906 may be added to a texture atlas 400a-c in the texture atlas set. In one implementation, the placement of the texture tile 300a-d may be performed in an optimized fashion or in another fashion to reduce the empty space in the texture atlases 400a-c.

In one implementation, empty space in each texture atlas 400a-c is represented by empty texture tiles 300a-d. In this implementation, the texture tile 300a-d being added to the texture atlas set may be placed in the location of the empty texture tile 300a-d that has the smallest area difference with the texture tile 300a-d being added. Once the texture tile 300a-d has been added, new empty texture tiles 300a-d may be created. These new empty texture tiles 300a-d may cover the area of the texture atlas 400a-c that was previously covered by the empty texture tile 300a-d, but is not covered by the texture tile 300a-d that was added. These new empty texture tiles 300a-d may be placed in the location of the area difference between the added texture tile 300a-d and the empty texture tile 300a-d.

In step 914, the texture tile 300a-d may be marked as processed. This may include, for example, setting a Boolean variable or otherwise denoting that the texture tile 300a-d has been placed in the texture atlas set. The method returns to step 902, wherein it is determined if there are any unprocessed texture tiles 300a-d remaining in the texture tile set.

The foregoing description of the invention is illustrative, and modifications in configuration and implementation will occur to persons skilled in the art. For instance, steps can be combined or may be performed in any order. While texture tiles and texture atlases have been described as physical segments of electronic memory capable of containing one or more polygons, they need not physically contain this memory. Rather, the texture tiles or texture atlases may include data specifying the dimensions of a sufficient segment of memory. Hardware, software or other resources described as singular may in embodiments be distributed, and similarly in embodiments resources described as distributed may be combined. The scope of the invention is accordingly intended to be limited only by the following claims.

I claim:

1. A computer-readable medium having a data structure stored thereon in the form of a texture atlas for use in applying a three-dimensional texture to a polygonal surface, comprising:
    a texture tile comprising:
        a separate number that distinguishes the texture tile from other texture tiles;
        coordinates that identify the texture tile location on the texture atlas;
    a texture atlas dimension;
    a texture atlas aspect ratio; and
    coordinates that identify the position of the texture atlas in a memory segment designated for the texture atlas.

2. The texture atlas of claim 1, wherein the texture tile further comprises:
    a representation of a polygon, the representation of the polygon comprising vertices, the vertices being at least partially contained in a thee-dimensional data volume;

a number that identifies the polygon;

a tile dimension;

a number that identifies the texture atlas that contains the tile; and coordinates that identify the position of the tile in a displayed image.

3. The texture atlas of claim 2, wherein the data volume comprises seismic data, the seismic data comprising at least one attribute from amplitude, phase, frequency, semblance and coherency.

4. The texture atlas of claim 2, wherein the polygon is a triangle.

5. The texture atlas of claim 2, wherein the representation of the polygon comprises distinct coordinates for each of its vertices.

6. The texture atlas of claim 1, wherein the memory segment comprises texture cache.

* * * * *